United States Patent

[11] 3,622,575

| [72] | Inventors | Brian Michael John Ellul;<br>Douglas Charles Harper, both of Ipswitch, England |
|---|---|---|
| [21] | Appl. No. | 760,064 |
| [22] | Filed | Sept. 16, 1968 |
| [45] | Patented | Nov. 23, 1971 |
| [73] | Assignee | Fisons Limited<br>Felixstowe, England |
| [32] | Priority | Sept. 20, 1967 |
| [33] | | Great Britain |
| [31] | | 42,806/67 |

[54] FERTILIZERS
4 Claims, No Drawings

[52] U.S. Cl. .................................................... 71/29,
71/35, 71/64 DB
[51] Int. Cl. ....................................................... C05b 15/00
[50] Field of Search ........................................... 23/106,
107, 1, 29; 71/35, 51, 61, 64, 64 D, 64 DA, 64 DB

[56] References Cited
UNITED STATES PATENTS

| 2,600,253 | 6/1952 | LUtz ............................. | 71/64 |
| 3,369,885 | 2/1968 | Takahashi et al. ............ | 71/29 |
| 3,408,169 | 10/1968 | Thompson et al. ........... | 71/28 |

OTHER REFERENCES

Madorsky et al., Industrial Engineering Chemistry, " Potassium Metaphosphate A Potential High-Analysis Fertilizer Material," Feb. 1940, Vol. 32 No. 2, pp. 244– 248 (copy in Scientific Libary).

*Primary Examiner*—Reuben Friedman
*Assistant Examiner*—Charles N. Hart
*Attorney*—Wenderoth, Lind & Ponack ABSTRACT: A granular fertilizer containing urea and a potassium metaphosphate of the general formula $(KPO_3)_nM$, where $n$ is a figure in the range 10 to 200 and M is an inorganic compound introduced to control the value of $n$. Examples of this inorganic compound are calcium chloride, ferric oxide and phosphate rock, etc. The present invention also provides for a process of producing such a fertilizer composition.

FERTILIZERS

The present invention relates to granular fertilizer compositions containing urea and potassium metaphosphate.

It has been proposed to make fertilizer compositions containing potassium metaphosphate but the potassium metaphosphate which was used contained little water-soluble $P_2O_5$ and in order to obtain a satisfactory level of water-soluble $P_2O_5$ it was necessary to add a water-soluble orthophosphate. It has now been found that highly concentrated water-soluble improved fertilizers can be obtained using mixtures containing urea and a potassium metaphosphate of the approximate formula $(KPO_3)_n$, the value of $n$ for which is in the range 10 to 200. A great advantage of this fertilizer composition is that the potassium metaphosphate of formula $(KPO_3)_n$ is not complexed by the soil to any great extent and since, unlike insoluble potassium metaphosphate, the phosphate is quickly dispersed in the soil, it is able to buffer the ammonia which is released by the hydrolysis of urea in soils thereby reducing the risk of damage by germinating seedlings arising from excessive ammonia concentration. Additionally this fertilizer composition causes little salt damage to plants.

Accordingly the present invention is for a granular fertilizer composition containing urea and a water-soluble potassium metaphosphate of the general formula $(KPO_3)_n$ or $(KPO_3)_nM$ where $n$ is a figure in the range 10 to 200 and M is an inorganic compound introduced to control the value of $n$. Water-soluble potassium metaphosphate is a polymeric material with a $P_2O_5/KA2O$ weight ratio of about 6:4 and is obtained by methods well known in the art. One such method involves the addition and mixing of inorganic compounds M, such as calcium chloride, ferric oxide, calcium oxide, magnesium oxide, silica, phosphate rock, etc. to molten potassium metaphosphate immediately prior to cooling. Other methods include rapid chilling of potassium metaphosphate, the incomplete dehydration of potassium dihydrogen phosphate, etc.

The granular fertilizer composition of the present invention may contain components in addition to urea and potassium metaphosphate. It may for instance contain ammonium salts such as ammonium sulfate and ammonium nitrate, potassium salts such as potassium chloride, potassium sulfate and dipotassium hydrogen phosphate, phosphates, such as diammonium phosphate, monocalcium phosphate and dicalcium phosphate, magnesium salts such as magnesium sulfate, fertilizer trace element salts and oxides such as those containing boron, zinc, copper, manganese, cobalt and iron, nitrification inhibitors, fillers such as calcium carbonate and sand, and the like.

These materials may be added to the potassium metaphosphate during manufacture thereof. Thus for example they may be added to the molten product resulting from the synthesis of potassium metaphosphate from potash and phosphoric acid.

Desirably the amount of urea in the composition is in the range 10 percent to 90 percent by weight based on the weight of the composition. Desirably the amount of potassium metaphosphate in the composition is in the range 10 percent to 90 percent by weight based on the weight of the composition. Preferably the composition of the present invention contains 25 percent to 90 percent weight of urea, 10 percent to 75 percent by weight of potassium metaphosphate and 0 to 50 percent of other materials.

Usefully the ratio by weight of urea to potassium metaphosphate is in the range 1:9 to 9:1 but preferably it is in the range 1:3 to 5:1.

The present invention also provides a process for preparing granular fertilizer compositions which comprises forming and granulating a mixture containing urea, potassium metaphosphate of the general formula $(KPO_3)_n$ or $(KPO_3)_nM$ where $n$ is a figure in the range 10 to 200 and M is an inorganic compound introduced to control the value of M and, optionally, other components.

The mixture may be granulated by a process wherein the mixture is compressed, as between compression rollers or extruded and the material thereby formed broken into granules. Preferably in this method the mixture contains 10 percent to 60 percent by weight of urea based on the weight of the mixture.

Granulation may also be effected by spraying molten urea on to a particulate material while tumbling the particulate material, the particulate material containing powdered potassium metaphosphate and, optionally, other fertilizer components and/or recycle material. The recycle material may be composed of product which is less than the granule size specification and ground product which prior to grinding is greater than the granule size specification. This method of granulation may be effected at an elevated temperature in the presence of water which may be added as a spray or as steam in the granulator. The tumbling may be effected for instance in a rotary drum. After granulation the granules may be dried for example in a rotary drier. The temperature of granulation is preferably in the range 90° C. to 125° C. and drying is desirably carried out at a temperature of less than 100° C.

Granulation may moreover be effected by forming a dispersion of potassium metaphosphate particles in molten urea and converting the dispersion into granules. Preferably the dispersion contains 50–90 percent by weight of urea. The dispersion may be cooled on a cold surface from which it is subsequently broken off as grains or flakes. Alternatively the dispersion may be prilled that is the dispersion is converted into drops and the drops are cooled until solid.

The drops of molten material may be cooled by allowing the drops to fall in to a cooling liquid for example an organic liquid such as a ketone, a chlorinated hydrocarbon or the like. In another method the drops of molten material are allowed to fall down a cooling tower. This method may be modified by allowing the drops to fall into a fluidized bed of solidified drops thereby effecting further cooling of the drops and cushioning the fall of the drops. In order to shorten the fall of the drops and at the same time coat the drops with powder the drops may be allowed to fall into a fluidized bed of a suitable powder such as a fluidized bed of talc, kieselguhr and the like. The fall of the drops may also be shortened by allowing the drops to fall through a dust-bearing gas zone having for example a dust content of 0.01 to 0.25 pounds per cubic foot. In this method of operation it is preferred that the drops fall through a fluidized bed of dust after falling through the dust-bearing gas zone. Examples of materials which may be used as components of the dust include potassium metaphosphate, limestone, sand, silica, sulfur, talc, clays magnesium compounds etc.

Finally, granulation may be effected by converting molten urea into droplets and passing the droplets into a dust-bearing gas zone and/or fluidized bed of particles containing potassium metaphosphate and, optionally, potassium chloride.

Desirably the granules obtained by the process of the present invention are coated with an inert dust such as talc to reduce their coating tendency.

The following examples, in which parts are by weight, are given to illustrate the process of the present invention.

EXAMPLE 1

A mixture containing 75 parts of urea and 25 parts of potassium metaphosphate $[(KPO_3)_n]$—where $n$ is less than 100, was heated to 135° C., and stirred to form a dispersion of the potassium metaphosphate in molten urea. This dispersion was prilled by forming the dispersion into droplets and causing the droplets to fall through a cooling tower to give a granular product which was 100 percent water-soluble, containing 34.8% N, 9.1% $K_2O$ and 13.8% $P_2O_5$. EXAMPLE 2

A mixture containing 75 parts of urea and 25 parts of potassium metaphosphate $[(KPO_3)_n]$—potassium chloride mixture (42.5% $P_2O_5$ and 42.5% $K_2O$) where $n$ is less than 100, was heated to 125° C. and stirred to form a dispersion of the potassium metaphosphate/potassium chloride in molten urea. This dispersion was prilled by forming the dispersion into droplets and causing the droplets to fall into carbon tetrachloride to give a granular product which was 100 percent water-soluble, containing 34.8% N, 10.6% $K_2O$, and 10.6% $P_2O_5$.

EXAMPLE 3

A mixture containing 56 parts of urea and 44 parts of potassium metaphosphate/potassium chloride mixture, was heated to 135° C. and stirred to form a dispersion of the potassium metaphosphate/potassium chloride in molten urea. This dispersion was prilled by forming the dispersion into droplets and causing the droplets to fall through a cooling tower containing a zone of talc dust-bearing gas to give a granular product which was 100 percent water-soluble containing 25.7% N, 19.1% $K_2O$ and 19.1% $P_2O_5$.

EXAMPLE 4

56 parts of dry molten urea at 135° C. was sprayed onto 24 parts of preheated potassium metaphosphate and 20 parts of recycle material while they were being tumbled in a rotary drum at 110° C. A granular product was obtained containing 31.2% N, 15.1% $P_2O_5$ and 10.0% $K_2O$.

EXAMPLE 5

A mixture containing 45 parts of urea and 55 parts of potassium metaphosphate/potassium chloride mixture, as used in example 2, was ground and compressed between rollers at a pressure of 5 tons per linear inch. The sheet material so formed was broken into granules having an analysis 20.6% N, 23.3% $P_2O_5$ and 23.2% $K_2O$.

EXAMPLE 6

Urea was prilled into a potassium metaphosphate dust (100% through 170 B.S.S.)—air zone having a low dust content, and the drops were then allowed to fall through a fluidized bed of potassium metaphosphate dust. A product was obtained containing 17.5% N, 32.6% $P_2O_5$, 23.0% $K_2O$.

EXAMPLE 7

A urea—ammonium nitrate mixture (75:25 wt./wt.) was prilled into a potassium metaphosphate dust (100% through 170 B.S.S.)—air zone having a low dust content; and the drops were then allowed to fall through a fluidised bed of potassium metaphosphate dust. A product was obtained containing 10.5% N, 40.2% $P_2O_5$, 28.5% $K_2O$.

EXAMPLE 8

A mixture containing 75 parts of urea and 25 parts of potassium metaphosphate $(KPO_3)_nM$—potassium chloride (42% $P_2O_5$, 42% $K_2O$, 2% $B_2O_3$) where $n$ is less than 100 was heated to 125° C. and stirred to form a dispersion of the potassium metaphosphate—potassium chloride—anhydrous boric oxide in molten urea. This dispersion was air prilled down a cooling tower to give a granular product containing 34.8% N, 10.5% $P_2O_5$, 10.5% $K_2O$, 0.15% B.

AGRONOMIC TEST

Three columns (cross section area 1.23 square inches) were filled with a mixture of soil and sand (50/50). In each column at a depth of 1.5 inches was placed a urea-containing fertilizer. The fertilizer in one column was urea, in another column it was urea with 50 percent water-soluble potassium metaphosphate and in another column it was urea with 50 percent water-insoluble potassium metaphosphate. In each case the amount of fertilizer was equivalent to 26.6 milligrams of urea nitrogen. After 3 days the pH of the soils were as shown in the following table.

| Depth (inches) | pH | | |
|---|---|---|---|
| | Urea alone | Urea + water-soluble potassium metaphosphate | Urea + water-insoluble potassium metaphosphate |
| 0.5 | 6.85 | 6.45 | 6.85 |
| 1.5 | 8.40 | 8.15 | 8.40 |
| 2.5 | 8.05 | 7.15 | 7.70 |

It is apparent from this table that the water-soluble potassium metaphosphate has effectively buffered the ammonia released by the breakdown of urea.

We claim:

1. A process for preparing granular fertilizer compositions which comprises forming and granulating a mixture containing urea, potassium metaphosphate of the general formula water-soluble $(KPO_3)_nM$ where $n$ is a figure in the range 10 to 200 and M is an inorganic compound introduced to control the value of M.

2. A process as claimed in claim 1 wherein granulation is effected by forming a dispersion of potassium metaphosphate particles in molten urea and converting the dispersion into granules.

3. A process as claimed in claim 1 wherein granulation is effected by converting molten urea into droplets and passing the droplets into at least one zone selected from zones containing dust-bearing gases and zones containing fluidized beds.

4. A granular fertilizer composition containing urea and a potassium metaphosphate of the general formula $(KPO_3)_nM$ where $n$ is a figure in the range 10 to 200 and M is an inorganic compound introduced to control the value of $n$ and is selected from the group consisting of calcium chloride, ferric oxide, calcium oxide, magnesium oxide, $B_2O_3$ silica and phosphate rock.

* * * * *